(12) United States Patent
Wu (10) Patent No.: US 12,546,977 B2
(45) Date of Patent: Feb. 10, 2026

(54) CAMERA LENS AND UNMANNED AERIAL VEHICLE

(71) Applicant: AUTEL ROBOTICS CO., LTD., Guangdong (CN)

(72) Inventor: Jun Wu, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 550 days.

(21) Appl. No.: 18/178,033

(22) Filed: Mar. 3, 2023

(65) Prior Publication Data

US 2023/0204929 A1 Jun. 29, 2023

Related U.S. Application Data

(63) Continuation of application No. PCT/CN2021/116508, filed on Sep. 3, 2021.

(30) Foreign Application Priority Data

Sep. 4, 2020 (CN) .......................... 202010922116.6

(51) Int. Cl.
*G02B 9/64* (2006.01)
*G02B 13/00* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 2016/0377846 A1 | 12/2016 | Lai et al. |
| 2017/0269588 A1 | 9/2017 | Lema et al. |

FOREIGN PATENT DOCUMENTS

| CN | 101210999 A | 7/2008 |
| CN | 105572854 A | 5/2016 |
| CN | 106908940 A | 6/2017 |
| CN | 208506352 U | 2/2019 |
| CN | 210181286 U | 3/2020 |
| CN | 210605170 U | 5/2020 |
| CN | 111596442 A | 8/2020 |

(Continued)

OTHER PUBLICATIONS

The Extended European Search Report dated Mar. 4, 2024; Appln. No. 21863712.2.

(Continued)

*Primary Examiner* — Wen Huang
(74) *Attorney, Agent, or Firm* — Frank Gao, Esq.

(57) ABSTRACT

A camera lens is installed in an unmanned aerial vehicle. The camera lens includes, from an object side to an image side, a first lens group, a second lens group, a diaphragm, and a third lens group. The first lens group includes a first lens having a negative refractive power and a second lens having a positive refractive power. The second lens group includes a third lens having a positive refractive power, a fourth lens having a positive refractive power, a fifth lens having a positive or negative refractive power, a sixth lens having a negative refractive power, and a seventh lens having a negative refractive power. The third lens group including an eighth lens having a positive refractive power and a ninth lens having a positive or negative refractive power. The camera lens needs only nine lenses to achieve high-quality imaging for the unmanned aerial vehicle.

18 Claims, 9 Drawing Sheets

(56) References Cited

FOREIGN PATENT DOCUMENTS

| | | | |
|---|---|---|---|
| CN | 211348834 | U | 8/2020 |
| CN | 111965790 | A | 11/2020 |
| JP | H08220436 | A | 8/1996 |
| JP | 2006065023 | A | 3/2006 |
| JP | 2014016466 | A | 1/2014 |

OTHER PUBLICATIONS

The International Search Report mailed Nov. 15, 2021; PCT/CN2021/116508.

CAMERA LENS AND UNMANNED AERIAL VEHICLE

CROSS-REFERENCE TO RELATED APPLICATION

This application is a continuation application of PCT application No. PCT/CN2021/116508, filed on Sep. 3, 2021, which claims the priority to Chinese patent application No. 202010922116.6, filed on Sep. 4, 2020, the entire contents of which is incorporated herein by reference.

TECHNICAL FIELD

Embodiments of the present disclosure relate to the technical field of optical design and, more particularly, to a camera lens and an unmanned aerial vehicle.

BACKGROUND

With the development of science and technology, high-tech camera products such as miniature single-lens reflex cameras and unmanned aerial vehicles (UAV) pose higher requirements for a camera lens, especially for a small lens module with a large target surface. On the one hand, a smaller camera lens is preferable for the disclosure on a tripod head of a UAV to move flexibly, because it occupies a smaller volume and adds little weight to the whole UAV; on the other hand, a camera lens is supposed to capture a clearer picture, which needs to increase a size of an imaging surface to accommodate more pixels.

In the implementation of the embodiments of the present disclosure, the inventors have found that the above-related art has at least the following problems. Conventionally, the size of the imaging surface of a lens is inversely proportional to the size of the lens. For example, an optical length of a focusing lens with a 4K or higher resolution and a 1-inch (16 mm) imaging target surface available from the market is generally 40 mm or more. That is to say, the miniaturization of the camera lens conflicts with the optimization of the imaging effect.

SUMMARY

In view of the above-mentioned disadvantages of the prior art, it is an object of embodiments of the present disclosure to provide a camera lens and an unmanned aerial vehicle having a small volume and a good imaging effect.

The object of the embodiments of the present disclosure is achieved through the following technical solution.

To solve the above technical problem, according to a first aspect, the present disclosure provides a camera lens, including:
- a first lens group including a first lens having a negative refractive power and a second lens having a positive refractive power;
- a diaphragm;
- a second lens group including a third lens having a positive refractive power, a fourth lens having a positive refractive power, a fifth lens having a positive or negative refractive power, a sixth lens having a negative refractive power, and a seventh lens having a negative refractive power; and
- a third lens group including an eighth lens having a positive refractive power and a ninth lens having a positive or negative refractive power.

In some embodiments, the ninth lens is an aspherical lens and a surface thereof near an image side is concave.

In some embodiments, the second lens and the seventh lens are aspherical lenses.

In some embodiments, the first lens and the sixth lens are concave lenses, and the third lens, the fourth lens, the fifth lens, and the eighth lens are convex lenses.

In some embodiments, the camera lens satisfies a relationship below:

$$-6.5<(f1+f2+f3)/f<2.5$$

$$2.2<TTL/f<4.2$$

wherein f1 is an effective focal length of the first lens group, f2 is the effective focal length of the second lens group, f3 is the effective focal length of the third lens group, f is the effective focal length of the camera lens, and TTL is a total lens length of the camera lens.

In some embodiments, the camera lens further satisfies a relationship below:

$$TTL/IH \leq 1.63$$

wherein TTL is the total lens length of the camera lens, and IH is a diagonal length of an effective pixel area on an imaging surface of the camera lens.

In some embodiments, the effective focal length of the first lens group satisfies a relationship below:

$$-65<f1<-10$$

wherein f1 is the effective focal length of the first lens group.

In some embodiments, the effective focal length of the second lens group satisfies a relationship below:

$$-11<f2<12$$

wherein f2 is the effective focal length of the second lens group.

In some embodiments, the effective focal length of the third lens group satisfies a relationship below:

$$-18<f3<45$$

wherein f3 is the effective focal length of the third lens group.

To solve the above technical problem, according to a second aspect, the present disclosure provides an unmanned aerial vehicle, wherein the unmanned aerial vehicle include: a controller communicatively connected to the camera lens according to the first aspect.

Compared with the prior art, the present disclosure is advantageous in that unlike the prior art, the embodiments of the present disclosure provide a camera lens including, from an object side to an image side, a first lens group including a first lens having a negative refractive power and a second lens having a positive refractive power; a diaphragm; a second lens group including a third lens having a positive refractive power, a fourth lens having a positive refractive power, a fifth lens having a positive or negative refractive power, a sixth lens having a negative refractive power, and a seventh lens having a negative refractive power; a third lens group including an eighth lens having a positive refractive power and a ninth lens having a positive or negative refractive power. The camera lens provided by the embodiments of the present disclosure needs only nine lenses to achieve high-quality imaging, and the lens is small in size, short in length, and good in portability.

BRIEF DESCRIPTION OF THE DRAWINGS

One or more embodiments are illustrated by way of example in the figures of the accompanying drawings rather than as limitations; in the drawings, elements/modules and steps having the same reference numerals indicate similar elements/modules and steps, and the figures are not drawn to scale unless specifically stated.

DETAILED DESCRIPTION

Hereinafter, the present disclosure will be described in detail with reference to specific embodiments. The following embodiments will help those skilled in the art further understand the present disclosure, but do not limit the disclosure in any way. It should be noted that a plurality of variations and modifications can be made by a person skilled in the art without departing from the inventive concept. All these variations and modifications shall fall within the scope of the present disclosure.

In order that the object, aspects and advantages of the present disclosure may be more clearly understood, a more detailed description of the disclosure is provided below with reference to the appended drawings and examples. It should be understood that the particular embodiments described herein are illustrative only and are not restrictive.

It should be noted that various features of the embodiments of the present disclosure can be combined with each other without conflict within the scope of the present disclosure. In addition, although a partition of functional blocks is provided in a schematic diagram of an apparatus, and a logical order is shown in a flowchart, in some cases, the steps shown or described may be performed in a manner different from the partition of functional blocks in the apparatus or the order in the flowchart.

Unless defined otherwise, all technical and scientific terms used in the description have the same meaning as commonly understood by one of ordinary skill in the art to which this disclosure belongs. The terminology used in the description of the disclosure herein is for the purpose of describing particular embodiments only and is not intended to limit the disclosure.

Furthermore, the technical features involved in the various embodiments of the present disclosure described below can be combined with each other as long as they do not conflict with each other.

Figure 1:
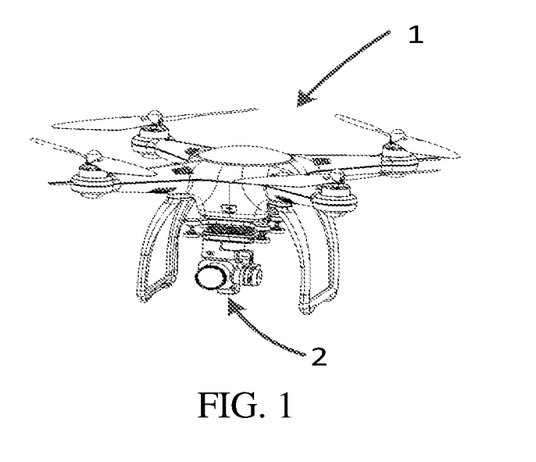
FIG. 1 is a schematic view showing an application environment of a camera lens according to an embodiment of the present disclosure.

To solve the problem that miniaturizing the camera lens is not compatible with improving the imaging effect, the present disclosure provides a camera lens using a combination of a plastic aspherical surface, a spherical surface, and a compound lens, which produces an auto-focusing (AF) and fixed-focus camera lens having a 4K or higher resolution, a 1-inch (16 mm) or bigger imaging target surface of the lens, and a 32 mm or shorter optical length. With reference to FIG. 1, a schematic diagram of an disclosure environment of a camera lens provided by an embodiment of the present disclosure is shown. As shown in FIG. 1, the camera lens 2 provided by the present disclosure can be mounted on an unmanned aerial vehicle 1, and a controller (not shown in FIG. 1) is provided in the unmanned aerial vehicle 1; the unmanned aerial vehicle 1 is communicatively connected to the camera lens 2 via the controller to realize data interaction between the controller and the camera lens 2. That is to say, the camera lens 2 can send a collected image to the controller, and the controller can also issue a control instruction to the camera lens 2 for photographing.

The camera lens 2 includes, from an object side to an image side, a first lens group, a second lens group, a diaphragm, and a third lens group. The first lens group includes a first lens having a negative refractive power and a second lens having a positive refractive power. The second lens group includes a third lens having a positive refractive power, a fourth lens having a positive refractive power, a fifth lens having a positive or negative refractive power, a sixth lens having a negative refractive power, and a seventh lens having a negative refractive power. The third lens group includes an eighth lens having a positive refractive power and a ninth lens having a positive or negative refractive power.

In some embodiments, the ninth lens is an aspherical lens, and a surface thereof near the image side is concave. Further, the second lens and the seventh lens are aspherical lenses. Further, the first lens and the sixth lens are concave lenses, and the third lens, the fourth lens, the fifth lens, and the eighth lens are convex lenses.

Herein, both the front and rear surfaces of the above-mentioned aspherical lens are aspherical, and a surface type of the aspherical lens is determined according to the following formula:

$$x = \frac{ch^2}{1 + \sqrt{1-(k+1)c^2h^2}} + \sum A_i h^i$$

where c is a curvature of a vertex of the aspherical surface, h is a height from any point on the aspherical surface to an optical axis, k is a conic constant, and $A_i$ is an ith order correction coefficient of the aspherical surface.

In some embodiments, the camera lens 2 satisfies a relationship below:

$$-6.5<(f1+f2+f3)/f<2.5$$

$$2.2<TTL/f<4.2$$

where f1 is an effective focal length (EFL) of the first lens group, f2 is the effective focal length of the second lens group, f3 is the effective focal length of the third lens group, f is the effective focal length of the camera lens 2, and TTL is a total lens length of the camera lens 2.

In some embodiments, the camera lens 2 further satisfies a relationship below:

$$TTL/IH \leq 1.63$$

where TTL is the total lens length of the camera lens, and IH is a diagonal length of an effective pixel area on an imaging surface of the camera lens 2.

In some embodiments, the effective focal length of the first lens group satisfies a relationship below:

$$-65<f1<-10$$

where f1 is the effective focal length of the first lens group, that is, the first lens group has a negative refractive power.

In some embodiments, the effective focal length of the second lens group satisfies a relationship below:

$$-11<f2<12$$

where f2 is the effective focal length of the second lens group, that is, the second lens group has a positive or negative refractive power.

In some embodiments, the effective focal length of the third lens group satisfies a relationship below:

$$-18<f3<45$$

where f3 is the effective focal length of the third lens group, that is, the third lens group has a positive or negative refractive power.

In particular, embodiments of the present disclosure will be further described below with reference to the drawings.

Embodiment 1

Figure 2:
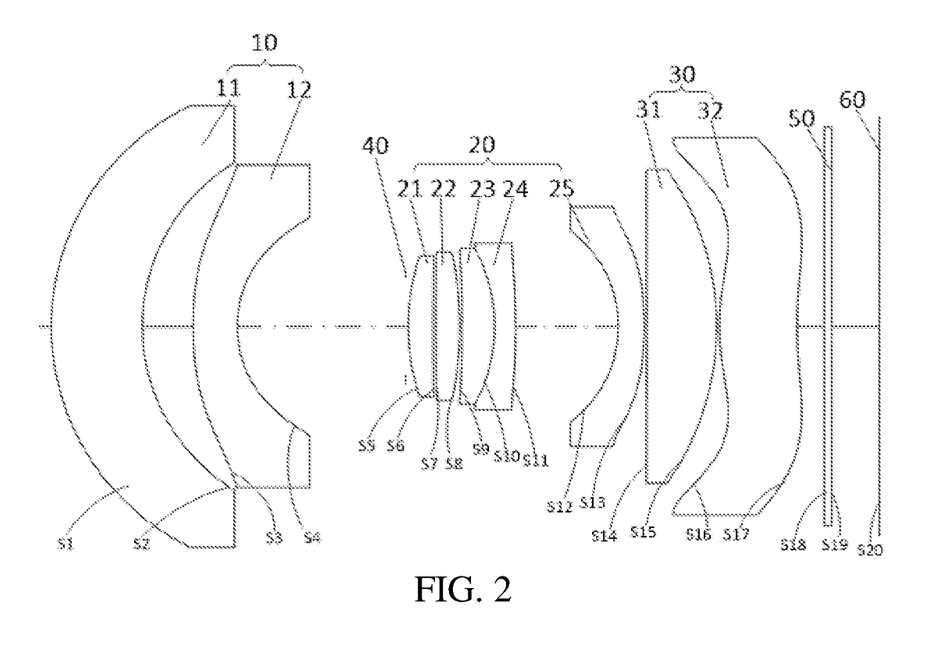
FIG. 2 is a schematic view showing an optical structure of the camera lens provided in Embodiment 1 of the present disclosure.

An embodiment of the present disclosure provides a camera lens 2. Referring to FIG. 2, an optical structure of the camera lens 2 is shown, in which light from an object to be captured passes sequentially through a first lens group 10 (successively through a first lens 11 and a second lens 12), a diaphragm 40, a second lens group 20 (successively through a third lens 21, a fourth lens 22, a fifth lens 23, a sixth lens 24, and a seventh lens 25), and a third lens group 30 (successively through an eighth lens 31 and a ninth lens 32) to be focused, and then the object is imaged on an imaging surface 60 after the light passes through a plate glass 50. The diaphragm 40 is used for limiting a throughput of the light from the subject to be imaged; the plate glass 50 may be a structure like a filter, and in particular, a function thereof may depend on a glass material selected; the imaging surface 60 is an imaging target surface having a size of 1 inch (16 mm) or more.

Figure 3:
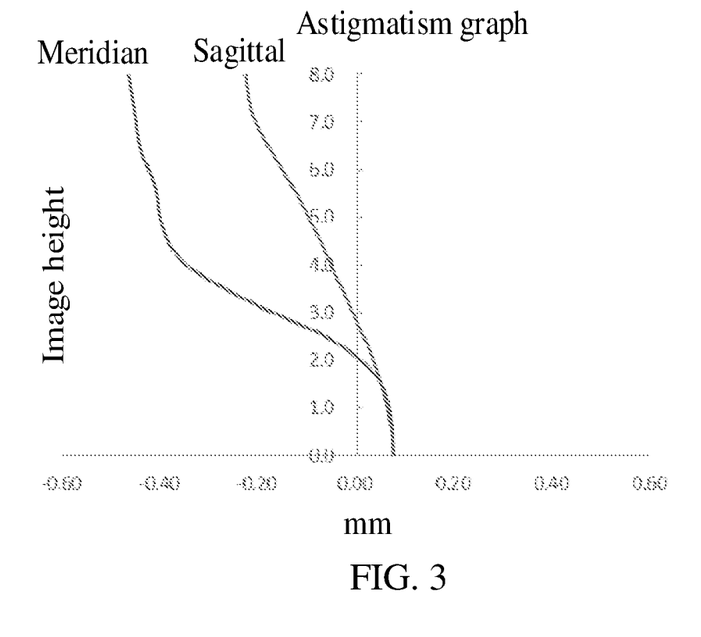
FIG. 3 is an astigmatism graph (mm) of the camera lens shown in FIG. 2.
Figure 4:
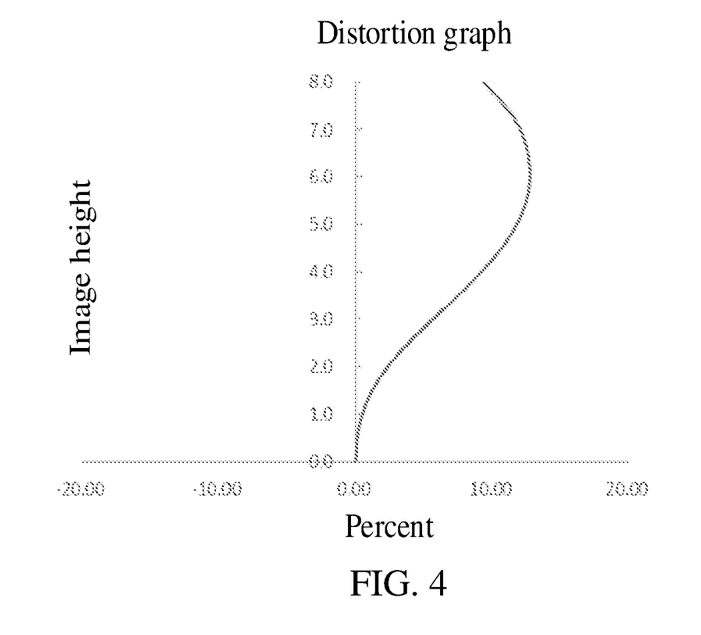
FIG. 4 is a distortion graph (%) of the camera lens shown in FIG. 2.
Figure 5:
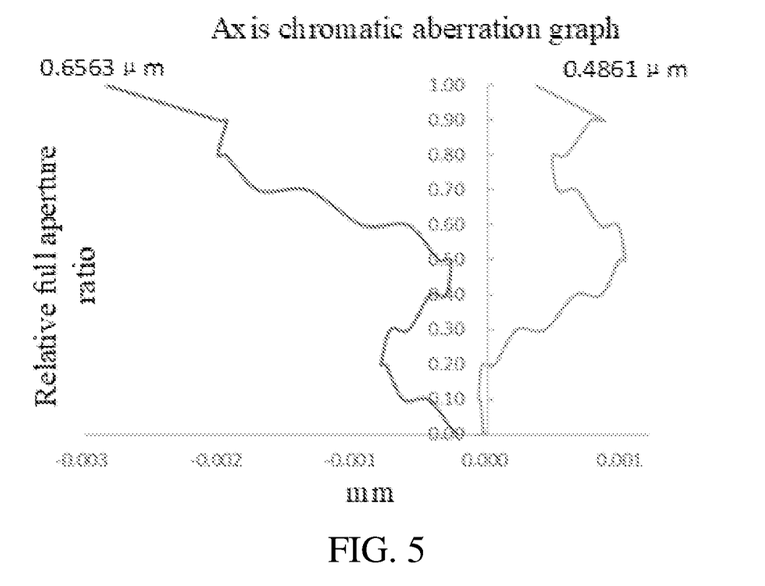
FIG. 5 is an axial chromatic aberration graph (mm) of the camera lens shown in FIG. 2.

Specifically, as shown in Tables 1 and 2 below, a set of actual design parameters of the camera lens 2 are provided by the embodiment of the present disclosure. Given the optical structure shown in FIG. 2 and the design parameters in Table 1 and Table 2, graphs capable of characterizing the image quality of the camera lens 2 are obtained as shown in FIGS. 3, 4, and 5. FIG. 3 is an astigmatism graph (mm) of the camera lens 2 shown in FIG. 2, wherein an astigmatism in a sagittal plane is less than 0.3 mm and the astigmatism in a meridian plane is less than 0.5 mm, meeting a high standard; FIG. 4 is a distortion graph (%) of the camera lens 2 shown in FIG. 2, wherein a distortion is controlled within 15%, meeting a high standard; FIG. 5 is an axial chromatic aberration graph (mm) of the camera lens 2 shown in FIG. 2, wherein an axial chromatic aberration of red light (C light) having a wavelength of 0.6563 μm is controlled within 0.003 mm, and the axial chromatic aberration of blue light (F light) having a wavelength of 0.4861 μm is controlled within 0.001 mm, meeting a high standard.

The embodiment of the present disclosure employs a combination of plastic aspheric, spherical, and compound lenses to achieve an auto-focusing (hereinafter AF) and fixed-focus lens having a 4K or higher resolution, a 1-inch (16 mm) or bigger imaging target surface of the lens, and a 32 mm or shorter optical length.

TABLE 1

| Surface No. | Surface Type | Radius of Curvature | Thickness | Refractive Index/Abbe Number |
|---|---|---|---|---|
| OBJ | Spherical surface | Infinite | Infinite | — |
| S1 | Spherical surface | 9.47 | 3.51 | 1.901224/27.7961 |
| S2 | Spherical surface | 7.41 | 1.96 | — |
| S3 | Aspherical surface | 14.65 | 1.70 | 1.496302/62.7871 |
| S4 | Aspherical surface | 4.77 | 6.49 | — |
| STOP | Spherical surface | Infinite | 0.10 | — |
| S5 | Spherical surface | 8.64 | 0.97 | 1.756309/52.1217 |
| S6 | Spherical surface | 149.34 | 0.10 | — |
| S7 | Spherical surface | 194.22 | 0.92 | 1.755002/52.3293 |
| S8 | Spherical surface | −13.69 | 0.10 | — |
| S9 | Spherical surface | −38.93 | 1.24 | 1.66362/5.8769 |
| S10 | Spherical surface | −6.32 | 0.80 | 1.723889/26.7709 |
| S11 | Spherical surface | −34.91 | 3.96 | — |
| S12 | Aspherical surface | −4.94 | 1.00 | 1.787339/23.9891 |
| S13 | Aspherical surface | −14.84 | 0.10 | — |
| S14 | Spherical surface | −1269.36 | 2.70 | 1.883001/39.2253 |
| S15 | Spherical surface | −10.54 | 0.10 | — |
| S16 | Aspherical surface | 8.19 | 3.00 | 1.755002/52.3293 |
| S17 | Aspherical surface | 15.33 | 1.04 | — |
| S18 | Spherical surface | Infinite | 0.30 | 1.516797/64.2123 |
| S19 | Spherical surface | Infinite | 1.83 | — |
| S20 | Spherical surface | Infinite | — | — |

TABLE 2

| Surface No. | Conic Coefficient | A4 | A6 | A8 | A10 | A12 | A14 |
|---|---|---|---|---|---|---|---|
| S3 | 0.00E+00 | 1.55E−03 | −4.99E−05 | 3.85E−07 | 0.00E+00 | 0.00E+00 | 0.00E+00 |
| S4 | 0.00E+00 | 2.57E−03 | −4.72E−05 | −2.69E−06 | 0.00E+00 | 0.00E+00 | 0.00E+00 |
| S12 | 0.00E+00 | −4.66E−04 | −1.47E−04 | 7.76E−06 | 0.00E+00 | 0.00E+00 | 0.00E+00 |
| S13 | 0.00E+00 | −2.81E−03 | 6.43E−05 | 8.74E−07 | 0.00E+00 | 0.00E+00 | 0.00E+00 |

TABLE 2-continued

| Surface No. | Conic Coefficient | A4 | A6 | A8 | A10 | A12 | A14 |
|---|---|---|---|---|---|---|---|
| S16 | 0.00E+00 | −2.86E−03 | −1.34E−05 | 4.82E−07 | 0.00E+00 | 0.00E+00 | 0.00E+00 |
| S17 | 0.00E+00 | −1.62E−03 | 5.60E−06 | 4.49E−08 | 0.00E+00 | 0.00E+00 | 0.00E+00 |

Embodiment 2

Figure 6:
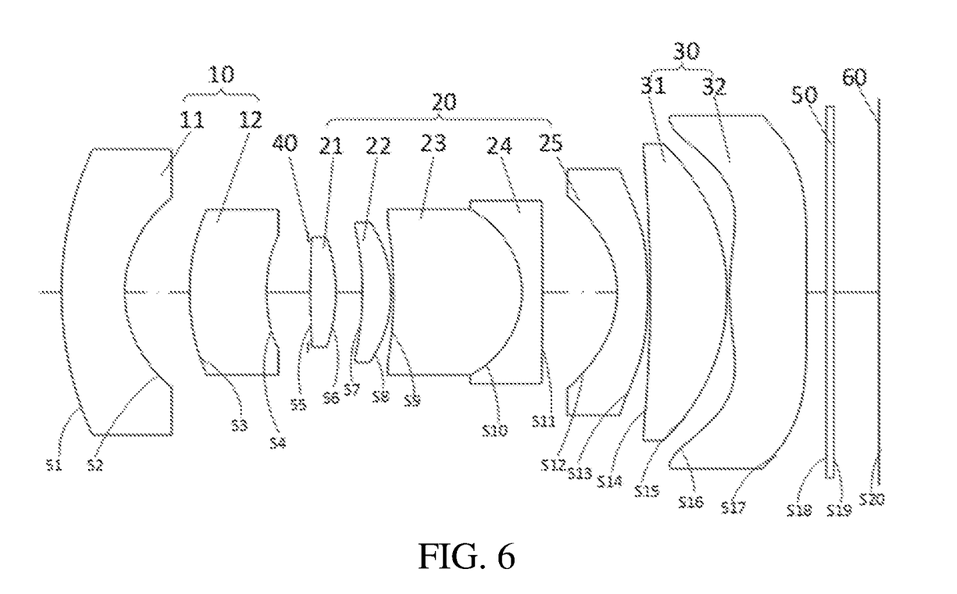
FIG. 6 is a schematic view showing an optical structure of the camera lens according to Embodiment 2 of the present disclosure.

An embodiment of the present disclosure provides a camera lens 2. Referring to FIG. 6, an optical structure of the camera lens 2 is shown, in which light from an object to be captured passes sequentially through the first lens group 10 (sequentially through the first lens 11 and the second lens 12), the diaphragm 40, the second lens group 20 (sequentially through the third lens 21, the fourth lens 22, the fifth lens 23, the sixth lens 24, and the seventh lens 25), and the third lens group 30 (sequentially through the eighth lens 31 and the ninth lens 32) to be focused, and then the object is imaged on the imaging surface 60 after the light passes through the plate glass 50. The diaphragm 40 is used for limiting the throughput of the light from the subject to be imaged; the plate glass 50 may be a structure like a filter, and in particular, the function thereof may depend on the glass material selected; the imaging surface 60 is an imaging target surface having a size of 1 inch (16 mm) or more.

Figure 7:
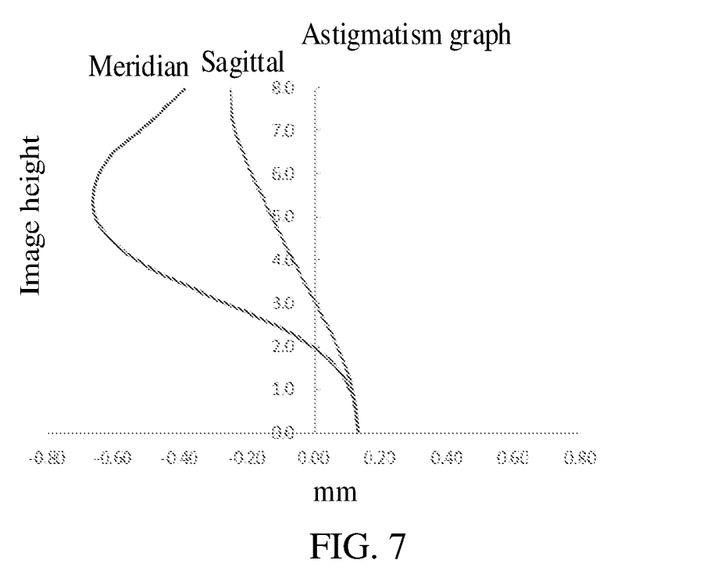
FIG. 7 is an astigmatism graph (mm) of the camera lens shown in FIG. 6.
Figure 8:
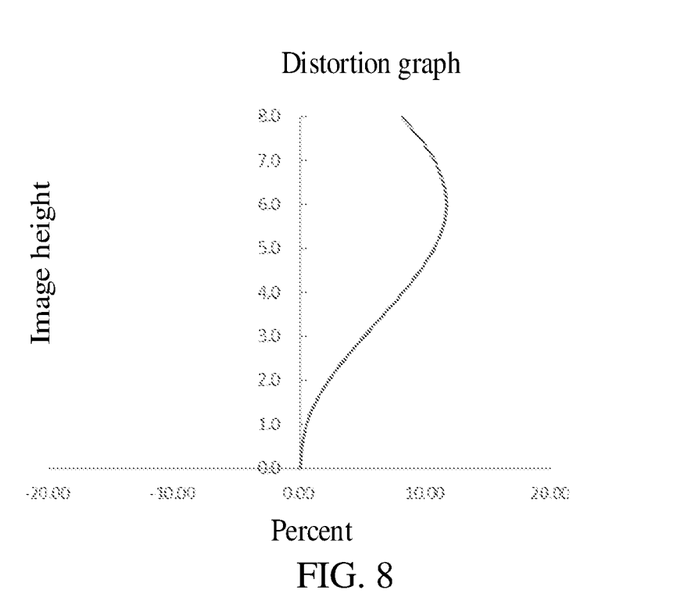
FIG. 8 is a distortion graph (%) of the camera lens shown in FIG. 6.
Figure 9:
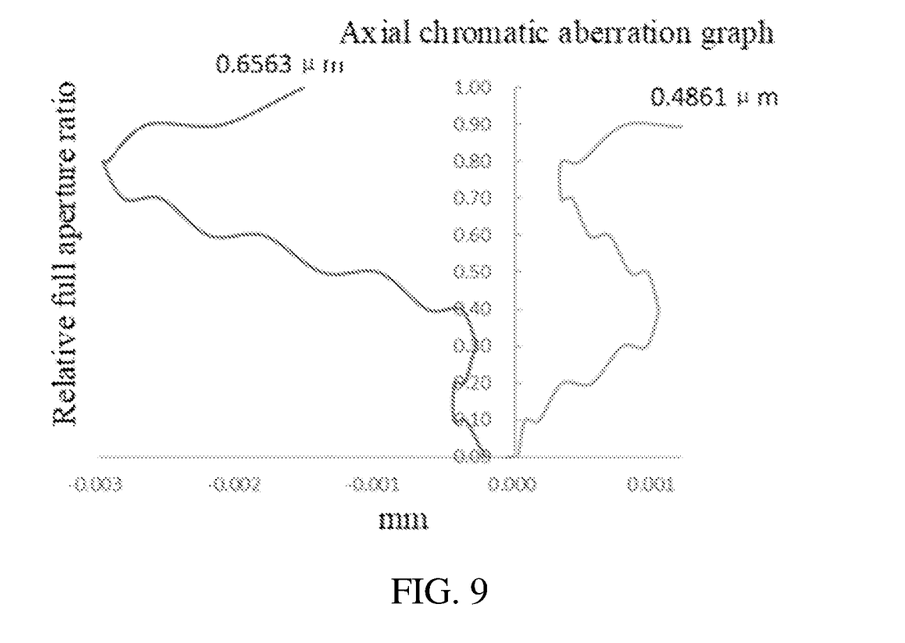
FIG. 9 is an axial chromatic aberration graph (mm) of the camera lens shown in FIG. 6.

Specifically, as shown in Table 3 and Table 4 below, a set of actual design parameters of the camera lens 2 are provided by the embodiment of the present disclosure. Given the optical structure shown in FIG. 6 and the design parameters in Table 3 and Table 4, graphs capable of characterizing the image quality of the camera lens 2 are obtained as shown in FIGS. 7, 8, and 9. FIG. 7 is an astigmatism graph (mm) of the camera lens 2 shown in FIG. 6, wherein an astigmatism in a sagittal plane is less than 0.3 mm and the astigmatism in a meridian plane is less than 0.7 mm, meeting a high standard; FIG. 8 is a distortion graph (%) of the camera lens 2 shown in FIG. 6, wherein a distortion is controlled within 15%, meeting a high standard; FIG. 9 is an axial chromatic aberration graph (mm) of the camera lens 2 shown in FIG. 6, wherein an axial chromatic aberration of red light (C light) having a wavelength of 0.6563 μm is controlled within 0.003 mm, and the axial chromatic aberration of blue light (F light) having a wavelength of 0.4861 μm is controlled within 0.001 mm, meeting a high standard.

The embodiment of the present disclosure employs a combination of plastic aspheric, spherical, and compound lenses to achieve an auto-focusing (hereinafter AF) and fixed-focus lens having a 4K or higher resolution, a 1-inch (16 mm) or bigger imaging target surface of the lens, and a 32 mm or shorter optical length.

TABLE 3

| Surface No. | Surface Type | Radius of Curvature | Thickness | Refractive Index/Abbe Number |
|---|---|---|---|---|
| OBJ | Spherical surface | Infinite | Infinite | — |
| S1 | Spherical surface | 15.11 | 2.46 | 1.755002/52.3293 |
| S2 | Spherical surface | 5.11 | 2.54 | — |
| S3 | Aspherical surface | 10.15 | 3.00 | 1.797583/23.6809 |
| S4 | Aspherical surface | 7.88 | 1.61 | — |
| STOP | Spherical surface | Infinite | 0.10 | — |
| S5 | Spherical surface | 65.44 | 0.99 | 1.76559/5.0713 |
| S6 | Spherical surface | −7.25 | 1.03 | — |
| S7 | Spherical surface | −12.86 | 1.12 | 1.788907/47.6134 |
| S8 | Spherical surface | −5.54 | 0.10 | — |
| S9 | Spherical surface | −18.11 | 5.00 | 1.648593/60.1867 |
| S10 | Spherical surface | −3.94 | 0.80 | 1.638375/31.4163 |
| S11 | Spherical surface | −207.06 | 2.92 | — |
| S12 | Aspherical surface | −4.57 | 1.18 | 1.756797/25.0117 |
| S13 | Aspherical surface | −25.89 | 0.10 | — |
| S14 | Spherical surface | −65.31 | 3.00 | 1.883001/39.2253 |
| S15 | Spherical surface | −8.90 | 0.10 | — |
| S16 | Aspherical surface | 11.63 | 3.00 | 1.775687/49.2996 |
| S17 | Aspherical surface | 5756.11 | 0.77 | — |
| S18 | Spherical surface | Infinite | 0.30 | 1.516797/64.2123 |
| S19 | Spherical surface | Infinite | 1.76 | — |
| S20 | Spherical surface | Infinite | — | — |

TABLE 4

| Surface No. | Conic Coefficient | A4 | A6 | A8 | A10 | A12 | A14 |
|---|---|---|---|---|---|---|---|
| S3 | 0.00E+00 | 7.16E−04 | −1.47E−05 | −9.26E−07 | 0.00E+00 | 0.00E+00 | 0.00E+00 |
| S4 | 0.00E+00 | 2.94E−03 | 2.47E−05 | 2.71E−06 | 0.00E+00 | 0.00E+00 | 0.00E+00 |
| S12 | 0.00E+00 | −2.38E−04 | 1.01E−04 | 1.06E−06 | 0.00E+00 | 0.00E+00 | 0.00E+00 |
| S13 | 0.00E+00 | −3.29E−03 | 1.34E−04 | −1.55E−06 | 0.00E+00 | 0.00E+00 | 0.00E+00 |
| S16 | 0.00E+00 | −2.04E−03 | −4.00E−05 | 8.57E−07 | 0.00E+00 | 0.00E+00 | 0.00E+00 |
| S17 | 0.00E+00 | −2.43E−04 | −1.56E−05 | 1.66E−07 | 0.00E+00 | 0.00E+00 | 0.00E+00 |

Embodiment 3

Figure 10:
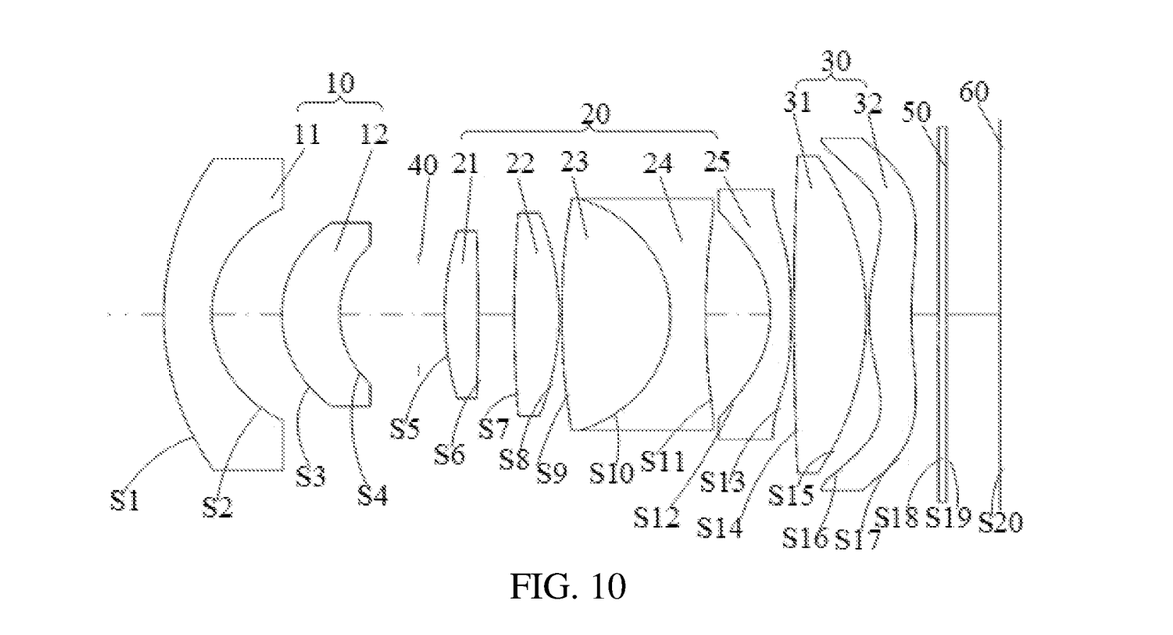
FIG. 10 is a schematic view showing an optical structure of the camera lens provided in Embodiment 3 of the present disclosure.

An embodiment of the present disclosure provides a camera lens 2. Referring to FIG. 10, an optical structure of the camera lens 2 is shown, in which light from an object to be captured passes sequentially through the first lens group 10 (successively through the first lens 11 and the second lens 12), the diaphragm 40, the second lens group 20 (successively through the third lens 21, the fourth lens 22, the fifth lens 23, the sixth lens 24, and the seventh lens 25), and the third lens group 30 (successively through the eighth lens 31 and the ninth lens 32) to be focused, and the object is then imaged on the imaging surface 60 after the light passes through the plate glass 50. The diaphragm 40 is used for limiting the throughput of light from the subject to be imaged, the plate glass 50 may be a structure like a filter, and in particular, the function thereof may depend on the glass material selected; the imaging surface 60 is an imaging target surface having a size of 1 inch (16 mm) or more.

Figure 11:
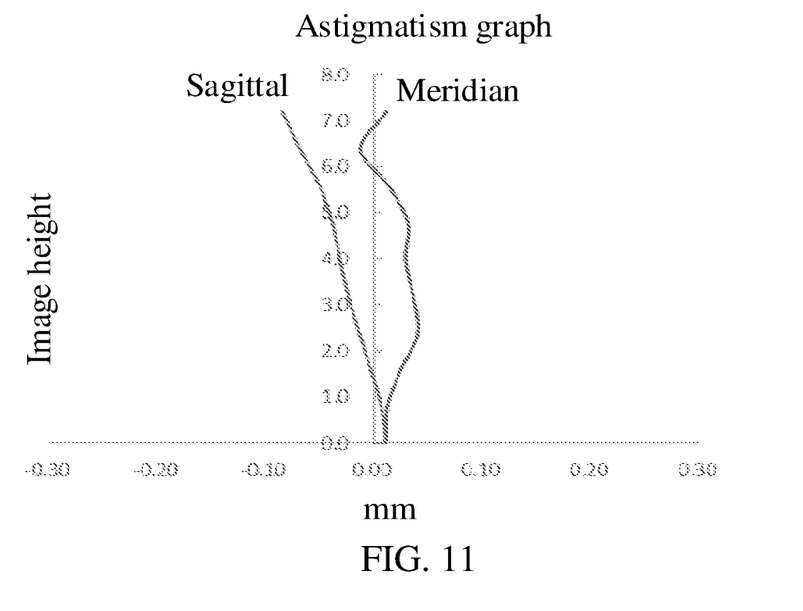
FIG. 11 is an astigmatism graph (mm) of the camera lens shown in FIG. 10.
Figure 12:
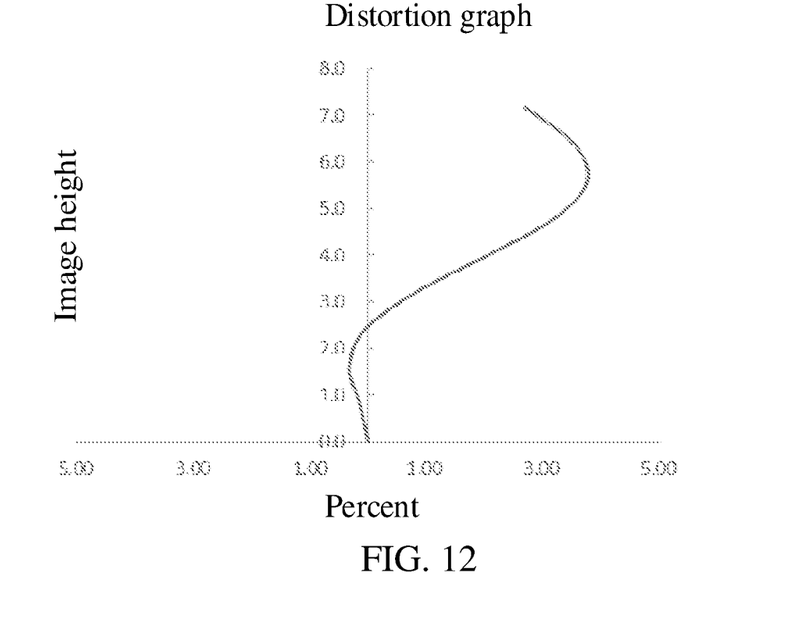
FIG. 12 is a distortion graph (%) of the camera lens shown in FIG. 10.
Figure 13:
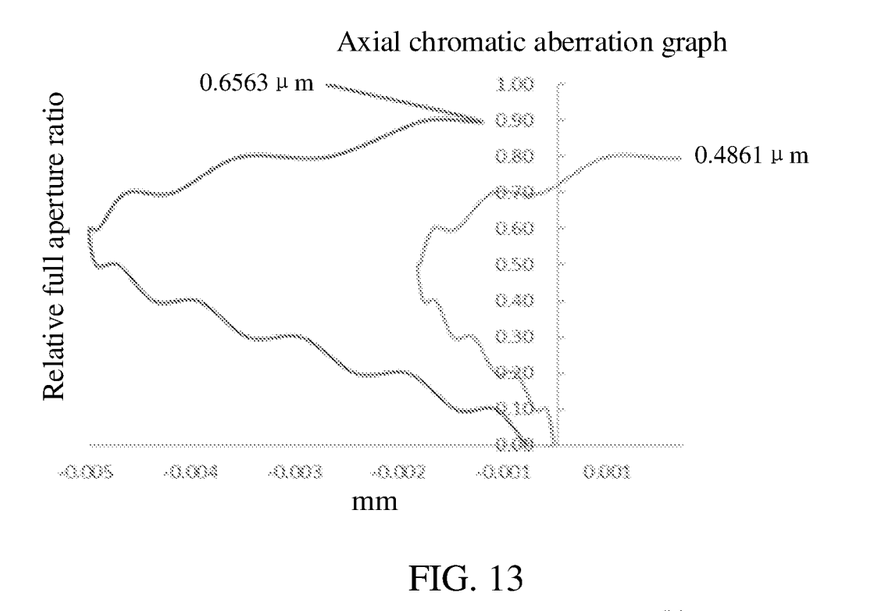
FIG. 13 is an axial chromatic aberration graph (mm) of the camera lens shown in FIG.

Specifically, as shown in Table 5 and Table 6 below, a set of actual design parameters of the camera lens 2 are provided by the embodiment of the present disclosure. Given the optical structure shown in FIG. 10 and the design parameters in Table 5 and Table 6, graphs capable of characterizing the image quality of the camera lens 2 are obtained as shown in FIGS. 11, 12, and 13. FIG. 11 is an astigmatism graph (mm) of the camera lens 2 shown in FIG. 10, wherein an astigmatism in a sagittal plane is less than 0.1 mm and the astigmatism in a meridian plane is less than 0.1 mm, meeting a high standard; FIG. 12 is a distortion graph (%) of the camera lens 2 shown in FIG. 10, wherein a distortion is controlled within 5%, meeting a high standard; FIG. 13 is an axial chromatic aberration graph (mm) of the camera lens 2 shown in FIG. 10, wherein an axial chromatic aberration of red light (C light) having a wavelength of 0.6563 μm is controlled within 0.005 mm, and the axial chromatic aberration of blue light (F light) having a wavelength of 0.4861 μm is controlled within 0.002 mm, meeting a high standard.

The embodiment of the present disclosure employs a combination of plastic aspheric, spherical, and compound lenses to achieve an auto-focusing (hereinafter AF) and fixed-focus lens having a 4K or higher resolution, a 1-inch (16 mm) or bigger imaging target surface of the lens, and a 32 mm or shorter optical length.

Embodiment 4

Figure 14:
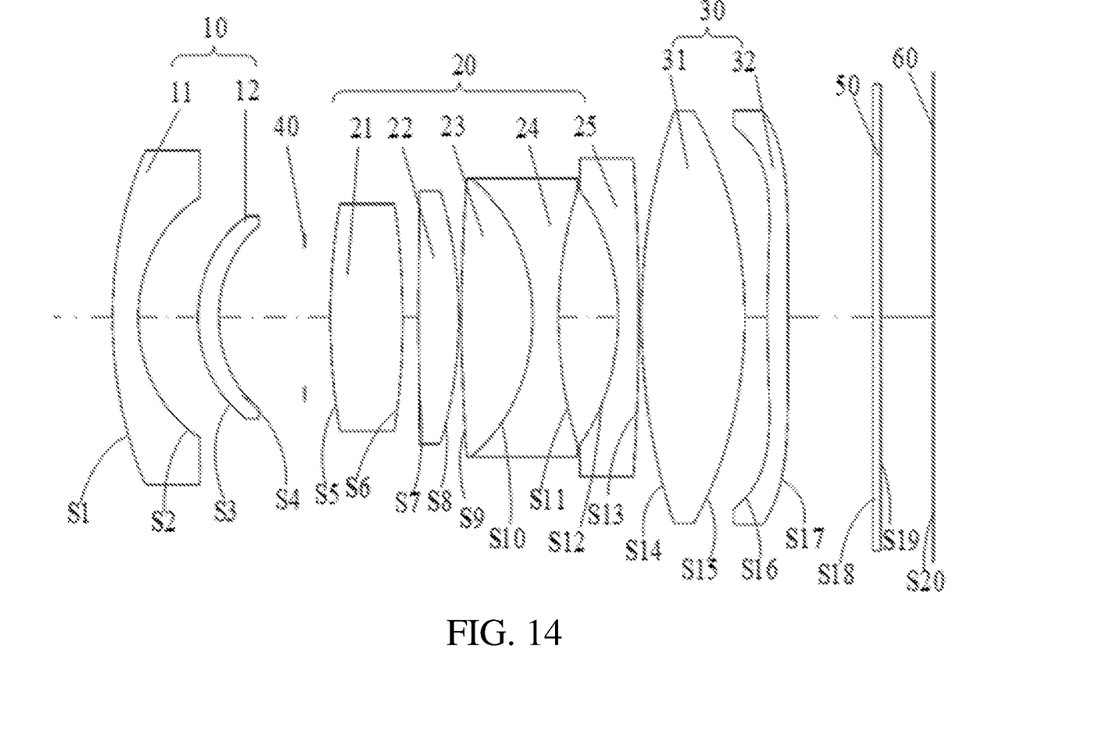
FIG. 14 is a schematic view showing an optical structure of the camera lens provided in Embodiment 4 of the present disclosure.

An embodiment of the present disclosure provides a camera lens 2. Referring to FIG. 14, an optical structure of the camera lens 2 is shown, in which light from an object to be captured passes through the first lens group 10 (successively through the first lens 11 and the second lens 12), the diaphragm 40, the second lens group 20 (successively through the third lens 21, the fourth lens 22, the fifth lens 23, the sixth lens 24, and the seventh lens 25), and the third lens group 30 (successively through the eighth lens 31 and the ninth lens 32) to be focused, and then the object is imaged on the imaging surface 60 after the light passes through the plate glass 50. The diaphragm 40 is used for limiting the throughput of light of the subject to be imaged, the plate glass 50 may be a structure like a filter, and in particular, the function thereof may depend on the glass material selected; the imaging surface 60 is an imaging target surface having a size of 1 inch (16 mm) or more.

Figure 15:
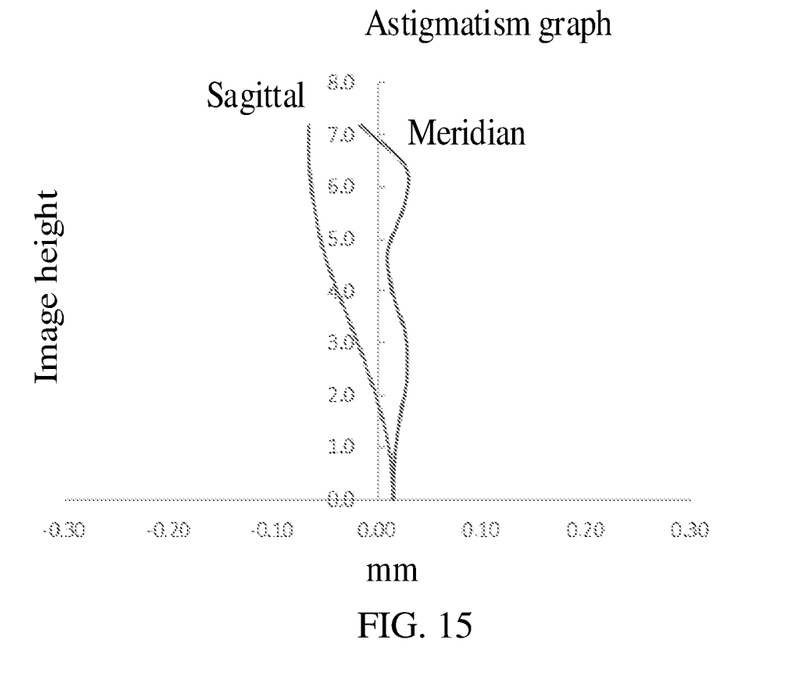
FIG. 15 is an astigmatism graph (mm) of the camera lens shown in FIG. 14.
Figure 16:
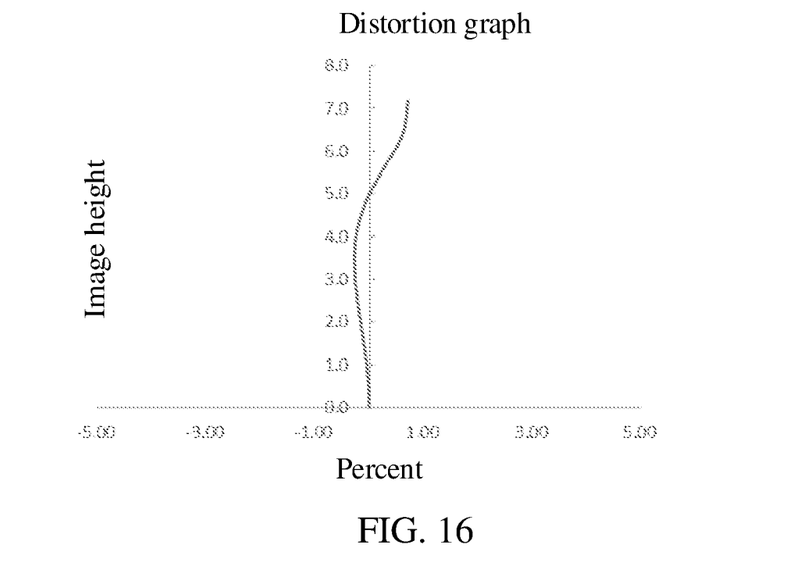
FIG. 16 is a distortion graph (%) of the camera lens shown in FIG. 14.
Figure 17:
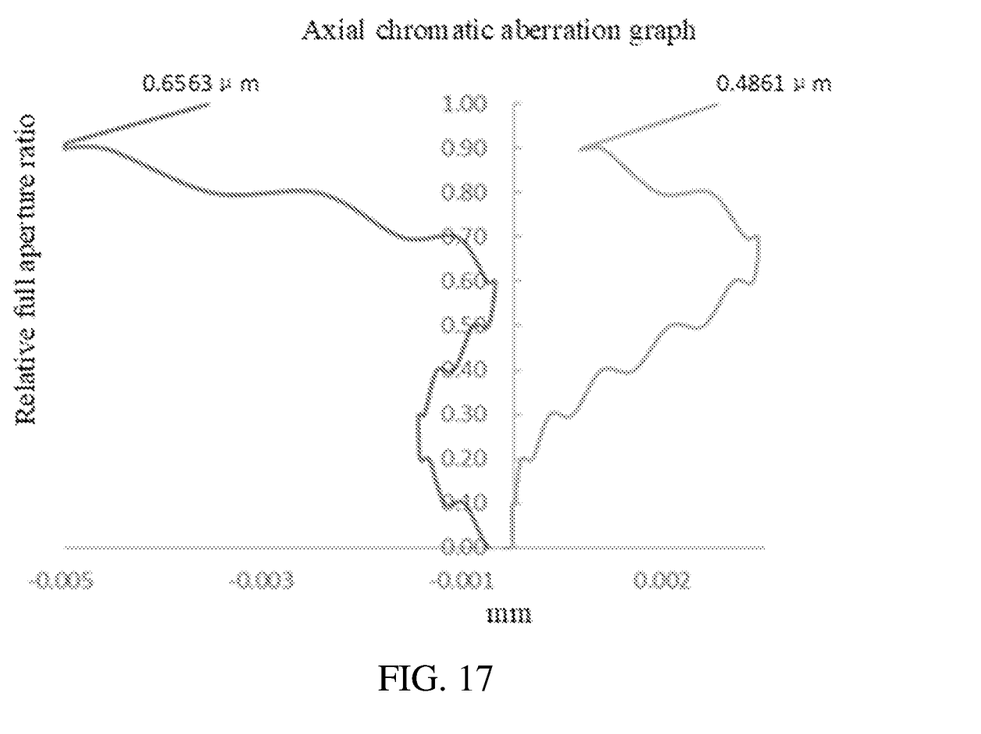
FIG. 17 is an axial chromatic aberration graph (mm) of the camera lens shown in FIG. 14.

Specifically, as shown in Table 7 and Table 8 below, a set of actual design parameters of the camera lens 2 are provided by the embodiment of the present disclosure. Given the optical structure shown in FIG. 14 and the design parameters in Table 7 and Table 8, graphs capable of characterizing the image quality of the camera lens 2 are obtained as shown in FIGS. 15, 16, and 17. FIG. 15 is an astigmatism graph (mm) of the camera lens 2 shown in FIG. 14, wherein an astigmatism in a sagittal plane is less than 0.1 mm and the astigmatism in a meridian plane is less than 0.1 mm, meeting a high standard; FIG. 16 is a distortion graph (%) of the camera lens 2 shown in FIG. 14, wherein a distortion is controlled within 1%, meeting a high standard; FIG. 17 is an axial chromatic aberration graph (mm) of the camera lens 2 shown in FIG. 14, wherein an axial chromatic aberration of red light (C light) having a wavelength of 0.6563 μm is controlled within 0.005 mm, and the axial chromatic aberration of blue light (F light) having a wavelength of 0.4861 μm is controlled within 0.002 mm, meeting a high standard.

The embodiment of the present disclosure employs a combination of plastic aspheric, spherical, and compound lenses to achieve an auto-focusing (hereinafter AF) and fixed-focus lens having a 4K or higher resolution, a 1-inch (16 mm) or bigger imaging target surface of the lens, and a 32 mm or shorter optical length.

TABLE 5

| Surface No. | Surface Type | Radius of Curvature | Thickness | Refractive Index/Abbe Number |
|---|---|---|---|---|
| OBJ | Spherical surface | Infinite | Infinite | — |
| S1 | Spherical surface | 11.64 | 1.83 | 1.660899/45.9706 |
| S2 | Spherical surface | 4.84 | 2.67 | — |
| S3 | Spherical surface | 4.67 | 2.20 | 1.543038/44.0804 |
| S4 | Spherical surface | 4.09 | 3.00 | — |
| STOP | Spherical surface | Infinite | 1.00 | — |
| S5 | Spherical surface | 12.64 | 1.27 | 1.762704/51.1392 |
| S6 | Spherical surface | −114.37 | 1.37 | — |
| S7 | Spherical surface | 53.97 | 1.71 | 1.755002/52.3293 |
| S8 | Spherical surface | −11.87 | 0.10 | — |
| S9 | Spherical surface | 30.00 | 4.14 | 1.611717/61.7851 |
| S10 | Spherical surface | −4.98 | 1.34 | 1.679432/29.2764 |
| S11 | Spherical surface | 30.84 | 2.46 | — |
| S12 | Aspherical surface | −4.84 | 0.80 | 1.711227/26.9063 |
| S13 | Aspherical surface | −28.25 | 0.10 | — |
| S14 | Spherical surface | 147.69 | 2.75 | 1.881471/39.3261 |
| S15 | Spherical surface | −12.41 | 0.10 | — |
| S16 | Aspherical surface | 7.72 | 1.63 | 1.755002/52.3293 |
| S17 | Aspherical surface | 19.03 | 1.04 | — |
| S18 | Spherical surface | Infinite | 0.30 | 1.516797/64.2123 |
| S19 | Spherical surface | Infinite | 2.03 | — |
| S20 | Spherical surface | Infinite | — | — |

TABLE 6

| Surface No. | Conic Coefficient | A4 | A6 | A8 | A10 | A12 | A14 |
|---|---|---|---|---|---|---|---|
| S12 | 0.00E+00 | −7.45E−04 | 1.11E−04 | 1.26E−06 | 0.00E+00 | 0.00E+00 | 0.00E+00 |
| S13 | 0.00E+00 | −2.98E−03 | 1.37E−04 | −1.37E−06 | 0.00E+00 | 0.00E+00 | 0.00E+00 |
| S16 | 0.00E+00 | −2.18E−03 | −4.20E−05 | 6.84E−07 | 0.00E+00 | 0.00E+00 | 0.00E+00 |
| S17 | 0.00E+00 | −9.29E−04 | −1.72E−05 | 2.21E−07 | 0.00E+00 | 0.00E+00 | 0.00E+00 |

TABLE 7

| Surface No. | Surface Type | Radius of Curvature | Thickness | Refractive Index/Abbe Number |
|---|---|---|---|---|
| OBJ | Spherical surface | Infinite | Infinite | — |
| S1 | Spherical surface | 12.24 | 1.00 | 1.52856/7.4438 |
| S2 | Spherical surface | 4.39 | 2.32 | — |
| S3 | Spherical surface | 3.83 | 0.80 | 1.4565/90.2697 |
| S4 | Spherical surface | 3.64 | 3.33 | — |

TABLE 7-continued

| Surface No. | Surface Type | Radius of Curvature | Thickness | Refractive Index/Abbe Number |
|---|---|---|---|---|
| STOP | Spherical surface | Infinite | 1.00 | — |
| S5 | Spherical surface | 18.80 | 2.81 | 1.814187/44.8208 |
| S6 | Spherical surface | −21.29 | 0.62 | — |
| S7 | Spherical surface | 216.71 | 1.56 | 1.832181/43.1143 |
| S8 | Spherical surface | −12.05 | 0.10 | — |
| S9 | Spherical surface | 49.38 | 2.77 | 1.609328/64.6233 |
| S10 | Spherical surface | −5.47 | 1.00 | 1.701854/2.7366 |
| S11 | Spherical surface | 12.04 | 2.32 | — |
| S12 | Spherical surface | −6.52 | 0.80 | 1.658059/29.9503 |
| S13 | Spherical surface | −61.57 | 0.10 | — |
| S14 | Spherical surface | 18.40 | 4.01 | 1.831179/4.3204 |
| S15 | Spherical surface | −12.31 | 0.87 | — |
| S16 | Aspherical surface | 34.76 | 0.80 | 1.792154/4.7225 |
| S17 | Aspherical surface | 500.80 | 3.30 | — |
| S18 | Spherical surface | Infinite | 0.30 | 1.516797/64.2123 |
| S19 | Spherical surface | Infinite | 2.03 | — |
| S20 | Spherical surface | Infinite | — | — |

TABLE 8

| Surface No. | Conic Coefficient | A4 | A6 | A8 | A10 | A12 | A14 |
|---|---|---|---|---|---|---|---|
| S3 | 0.00E+00 | −4.43E−04 | −2.25E−05 | 2.50E−07 | −7.15E−09 | 5.23E−11 | 0.00E+00 |
| S4 | 0.00E+00 | 3.21E−05 | −1.86E−05 | 2.54E−07 | −1.98E−09 | 2.30E−13 | 0.00E+00 |

The embodiments of the present disclosure provide a camera lens 2, and the camera lens 2 includes, from an object side to an image side, a first lens group including a first lens having a negative refractive power and a second lens having a positive refractive power; a diaphragm; a second lens group including a third lens having a positive refractive power, a fourth lens having a positive refractive power, a fifth lens having a positive or negative refractive power, a sixth lens having a negative refractive power, and a seventh lens having a negative refractive power; a third lens group including an eighth lens having a positive refractive power and a ninth lens having a positive or negative refractive power. The camera lens 2 provided by the embodiments of the present disclosure needs only nine lenses to achieve high-quality imaging, and the lens is small in size, short in length, and good in portability.

It should be noted that the embodiments of the apparatus described above are merely exemplary, wherein the elements illustrated as separate components may be physically separated or not, and the components shown as elements may be physical elements or not, that is, may be located at one place, or may also be elements distributed over a network. Some or all of the elements may be selected to achieve the object of the embodiments as appropriate.

Finally, it should be noted that the above embodiments are merely illustrative of the technical solution of the present disclosure, rather than limiting the same; combinations of features in the above embodiments or different embodiments are also possible within the spirit of the disclosure; steps can be implemented in any order; many other variations of the different aspects of the disclosure described above are possible, which are not provided in detail for the sake of brevity. Although the present disclosure is described in detail with reference to the foregoing embodiments, those skilled in the art will appreciate that the technical solution disclosed in the above-mentioned embodiments can still be modified, or some of the technical features thereof can be replaced by equivalents; such modification and replacement do not depart from the spirit and scope of the embodiments of the present disclosure.

The invention claimed is:

1. A camera lens, comprising, from an object-side to an image-side:
   a first lens group comprising a first lens having a negative refractive power, and a second lens having a positive refractive power;
   a diaphragm;
   a second lens group comprising a third lens having a positive refractive power, a fourth lens having a positive refractive power, a fifth lens having a positive or negative refractive power, a sixth lens having a negative refractive power, and a seventh lens having a negative refractive power; and
   a third lens group comprising an eighth lens having a positive refractive power, and a ninth lens having a positive or negative refractive power.

2. The camera lens according to claim 1, wherein the ninth lens is an aspherical lens, and a surface thereof near an image side is concave.

3. The camera lens according to claim 2, wherein the second lens and the seventh lens are aspherical lenses.

4. The camera lens according to claim 3, wherein the first lens and the sixth lens are concave lenses, and the third lens, the fourth lens, the fifth lens, and the eighth lens are convex lenses.

5. The camera lens according to claim 1, wherein the camera lens satisfies a relationship below:

$$-6.5<(f1+f2+f3)/f<2.5$$

$$2.2<TTL/f<4.2$$

wherein f1 is an effective focal length of the first lens group, f2 is the effective focal length of the second lens group, f3 is the effective focal length of the third lens group, f is the effective focal length of the camera lens, and TTL is a total lens length of the camera lens.

6. The camera lens according to claim 5, wherein the camera lens further satisfies a relationship below:

$$TTL/IH \leq 1.63$$

wherein TTL is the total lens length of the camera lens, and IH is a diagonal length of an effective pixel area on an imaging surface of the camera lens.

7. The camera lens according to claim 5, wherein the effective focal length of the first lens group satisfies a relationship below:

$$-65<f1<-10$$

wherein f1 is the effective focal length of the first lens group.

8. The camera lens according to claim 5, wherein the effective focal length of the second lens group satisfies a relationship below:

$$-11<f2<12$$

wherein f2 is the effective focal length of the second lens group.

9. The camera lens according to claim 5, wherein the effective focal length of the third lens group satisfies a relationship below:

$$-18<f3<45$$

wherein f3 is the effective focal length of the third lens group.

10. An unmanned aerial vehicle, comprising a controller and a camera lens, the controller being communicatively connected to the camera lens, the camera lens comprising, from an object-side to an image-side:
- a first lens group comprising a first lens having a negative refractive power, and a second lens having a positive refractive power;
- a diaphragm;
- a second lens group comprising a third lens having a positive refractive power, a fourth lens having a positive refractive power, a fifth lens having a positive or negative refractive power, a sixth lens having a negative refractive power, and a seventh lens having a negative refractive power; and
- a third lens group comprising an eighth lens having a positive refractive power, and a ninth lens having a positive or negative refractive power.

11. The unmanned aerial vehicle according to claim 10, wherein the ninth lens is an aspherical lens, and a surface thereof near an image side is concave.

12. The unmanned aerial vehicle according to claim 11, wherein the second lens and the seventh lens are aspherical lenses.

13. The unmanned aerial vehicle according to claim 12, wherein the first lens and the sixth lens are concave lenses, and the third lens, the fourth lens, the fifth lens, and the eighth lens are convex lenses.

14. The unmanned aerial vehicle according to claim 10, wherein the camera lens satisfies a relationship below:

$$-6.5<(f1+f2+f3)/f<2.5$$

$$2.2<TTL/f<4.2$$

wherein f1 is an effective focal length of the first lens group, f2 is the effective focal length of the second lens group, f3 is the effective focal length of the third lens group, f is the effective focal length of the camera lens, and TTL is a total lens length of the camera lens.

15. The unmanned aerial vehicle according to claim 14, wherein the camera lens further satisfies a relationship below:

$$TTL/IH \leq 1.63$$

wherein TTL is the total lens length of the camera lens, and IH is a diagonal length of an effective pixel area on an imaging surface of the camera lens.

16. The unmanned aerial vehicle according to claim 14, wherein the effective focal length of the first lens group satisfies a relationship below:

$$-65<f1<-10$$

wherein f1 is the effective focal length of the first lens group.

17. The unmanned aerial vehicle according to claim 14, wherein the effective focal length of the second lens group satisfies a relationship below:

$$-11<f2<12$$

wherein f2 is the effective focal length of the second lens group.

18. The unmanned aerial vehicle according to claim 14, wherein the effective focal length of the third lens group satisfies a relationship below:

$$-18<f3<45$$

wherein f3 is the effective focal length of the third lens group.

* * * * *